(12) United States Patent
Elhardt et al.

(10) Patent No.: US 6,213,235 B1
(45) Date of Patent: Apr. 10, 2001

(54) HOOD LIFT MECHANISM

(75) Inventors: Paul M. Elhardt; Thomas G. Lykken; Thompson M. Rivers, all of Fargo, ND (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/168,781

(22) Filed: Oct. 8, 1998

(51) Int. Cl.[7] .................................................. B62D 25/10

(52) U.S. Cl. .................. 180/69.2; 180/69.21; 180/69.23; 180/69.24; 180/89.13; 180/89.14; 180/89.15; 292/DIG. 14; 292/63

(58) Field of Search ............................... 180/69.21, 69.2, 180/69.23, 69.24, 89.17, 89.18, 69, 89.13, 89.14, 89.15; 292/DIG. 14, 63

(56) References Cited

U.S. PATENT DOCUMENTS

| | | | |
|---|---|---|---|
| 1,390,751 | * | 9/1921 | Dall . |
| 2,091,673 | * | 8/1937 | De'Orlow . |
| 2,125,569 | * | 8/1938 | Hynes . |
| 2,135,613 | * | 11/1938 | De Orlow ........................... 180/69.2 |
| 2,184,086 | * | 12/1939 | Saunders . |
| 2,185,212 | * | 1/1940 | Claud-Mantle ..................... 180/69.2 |
| 2,322,630 | * | 6/1943 | Greig . |
| 2,332,377 | * | 10/1943 | Haltenberger . |
| 2,333,173 | * | 11/1943 | Gunning .............................. 180/69.2 |
| 2,796,288 | * | 6/1957 | Green . |
| 2,886,362 | * | 5/1959 | Dall . |
| 3,815,176 | * | 6/1974 | Porter ..................................... 180/69 |
| 3,893,207 | * | 7/1975 | Rudaitis et al. ........................ 180/69 |
| 4,151,891 | * | 5/1979 | Parr ........................................ 180/69 |
| 4,186,476 | * | 2/1980 | Mair et al. ......................... 180/69 X |
| 4,206,944 | * | 6/1980 | Kumagai et al. .................... 180/69.2 |
| 4,382,482 | | 5/1983 | Brandl et al. . |
| 4,566,552 | * | 1/1986 | Hoffman et al. .................. 180/69.21 |

(List continued on next page.)

OTHER PUBLICATIONS

Westlaw Database—EP 792787 based on a Priority App.—US 608114 Feb. 28, 1996.

*Primary Examiner*—Lanna Mai
*Assistant Examiner*—Toan To
(74) *Attorney, Agent, or Firm*—Foley & Lardner (57) ABSTRACT

Disclosed herein is a work vehicle, such as a tractor, having a frame, a compartment, a hood coupled to the frame and configured to at least partially cover the compartment when disposed in a closed position; and a mechanism coupling the hood to the frame, the mechanism configured to move the hood between the closed position and at least one at least partially opened position, the mechanism including at least one four-bar linkage, a first bar of the linkage including a portion of the frame and a second bar of the linkage including a portion of the hood, the vehicle further having a support member configured to engage the at least one linkage at predetermined positions and thereby immobilize the hood against further changes in position. The support member has a first portion movably secured to the vehicle, a second portion configured as a handle, and an intermediate portion disposed between the first and second portions and including at least one catch member disposed to engage an engaging member of the at least one linkage. The vehicle includes a primary latch for securing the hood to the frame in the closed position, and a secondary latch for backing up the primary latch in the closed position by engaging a support member catch with an engaging member of the at least one linkage. The vehicle further comprises a coupler coupling the support member to the primary latch whereby the support member functions as a single lever actuating device of both the primary and secondary latches. The vehicle further comprises at least one biasing device selectable in spring constant and preload and configurable in locating of mounting whereby a particular biasing device may be used to balance a hood of particular weight and weight distribution in the open, closed, and intermediate positions.

34 Claims, 8 Drawing Sheets

U.S. PATENT DOCUMENTS

| | | |
|---|---|---|
| 4,572,312 | 2/1986 | France et al. . |
| 4,991,675 * | 2/1991 | Tosconi et al. ............... 180/89.17 X |
| 5,435,406 * | 7/1995 | Gaffoglio et al. ................. 180/69.21 |
| 5,465,803 * | 11/1995 | Kircher et al. .................... 180/69.21 |
| 5,538,097 | 7/1996 | Stauffer et al. . |
| 5,564,514 | 10/1996 | Knight . |
| 5,634,525 | 6/1997 | Templeton et al. . |
| 5,730,239 * | 3/1998 | Holter ............................... 180/69.21 |
| 5,738,179 * | 4/1998 | Matsui .............................. 180/69.21 |
| 5,803,198 * | 9/1998 | Baxter et al. ...................... 180/69.21 |
| 5,901,803 * | 5/1999 | Harada ............................... 180/69.2 |
| 5,975,228 * | 12/1999 | Parfitt ................................ 180/69.21 |

\* cited by examiner

HOOD LIFT MECHANISM

FIELD OF THE INVENTION

The present invention relates to work vehicles, such as agricultural tractors and construction equipment, having a compartment containing, e.g., an engine, machinery, or tools. It relates particularly to such vehicles having openable hoods for covering such compartments when in a closed position.

BACKGROUND OF THE INVENTION

Work vehicles, including agricultural tractors and construction equipment, have long been provided with engine compartments, and in some cases additional compartments for other uses, which are often desired to be at least partially covered for protection from dust, debris, weather, theft, etc. Engine compartments may be covered to also contain noise and to route cooling air flow. Such compartments are generally kept covered by hoods in normal use of the vehicle and in storage, but must be opened to provide access for periodic maintenance and inspection and for repairs.

Hoods are generally too heavy to be readily removed and set aside, and so are provided with opening, or "lift", mechanisms. Many such lift mechanisms comprise simply pivots, or hinges, at one end of the hood, often including a torsion spring or gas spring to balance the weight of the hood when in an opened position. Some mechanisms, with or without a balancing spring, also include a support rod for propping the raised hood up in its opened position. Such mechanisms reposition a hood in a manner which provides substantially full access to the interior of the compartment at the end at which the hood has been raised, but access at the pivot end which is often marginal. Such hoods must then be removed and set aside, often with a lift truck or a crane, for work to be performed on an item within, and at the hood pivot end of, the compartment.

Other types of hood opening mechanisms are known, including one in which a hood slides longitudinally upon rollers riding in a track and does not lift; while this mechanism provides reasonably full access to the interior of the compartment, it is costly and requires an inordinately long garage stall to accommodate it. Another type of mechanism includes a four-bar linkage which both pivots and translates the hood in an arcuate path of motion. These are relatively effective, but have not heretofore included a backup latch which is both actuatable in the closed position with a single control device and supported in the opened position with the same control device.

There has been, therefore, a longstanding need for a hood lift mechanism which repositions the hood in a manner which provides substantially full access to items within a compartment, and which includes a simple apparatus for both backing up a primary hood latch and supporting the hood in its opened position.

SUMMARY

The present invention relates to a work vehicle comprising a frame, a compartment, a hood coupled to the frame and configured to at least partially cover the compartment when disposed in a first position wherein the hood is closed, and a mechanism coupling the hood to the frame. The mechanism is configured to move the hood between the first position and at least a second position, wherein the hood is at least partially opened. The mechanism includes at least one four-bar linkage, a first bar of the linkage including a portion of the frame and a second bar of the linkage including a portion of the hood, the vehicle further having a support member configured to engage the at least one linkage at predetermined positions corresponding to the first and at least second positions of the hood and thereby immobilize the at least one linkage, and thereby the hood, against a further change in position.

In another aspect of invention, the support member has a first portion movably secured to the vehicle, a second portion configured as a handle, and an intermediate portion disposed between the first and second portions and including at least one support member catch member disposed to engage an engaging member of the at least one linkage and thereby immobilize the at least one linkage when the hood is in a predetermined position, the at least one catch member engageable and disengageable by movement of the support member with respect to the vehicle.

In another aspect of the invention, the work vehicle includes a primary latch for securing the hood to the frame in the first position and further comprises a secondary latch for backing up the primary latch, the secondary latch including a first catch member positioned on the support member for engagement of an engaging member of the at least one linkage to secure the hood in its first position regardless of the proper functioning of the primary latch.

In another aspect of the invention, the work vehicle further comprises a coupler coupling the support member to the primary latch wherein the support member functions as a single lever actuating device of both the primary latch and the secondary latch when the hood is in its first position.

In another aspect of the invention, the work vehicle further comprises at least one biasing device disposed within the mechanism and configured to oppose the weight of the hood, the hood being thereby movable between positions regardless of the weight and the weight distribution of the hood. The at least one biasing device is configured to generate a first balancing moment of a first value and sense when the hood is in its first position, a second balancing moment of a second value and sense when the hood is in its second position, and a balancing moment of an intermediate value and a sense corresponding to the amount of opening of the hood when the hood is partially opened, the hood being thereby substantially balanced when it its first, second, and intermediate positions.

In another aspect of the invention, the biasing device has a predetermined spring rate and is selected from a plurality of biasing devices having differing spring rates, to provide a particular value of balancing moment associated with the weight and the weight distribution of a particular hood.

In another aspect of the invention, the preload of the biasing device is adjustable to provide a particular predetermined value of balancing moment associated with the weight and the weight distribution of a particular hood.

In another aspect of the invention, the work vehicle further comprises a mounting device coupled to an end of the biasing device and configured to be mounted to a particular position of the frame corresponding to the weight and the weight distribution of a particular hood, and including a threaded member for preloading of the biasing device to the predetermined value.

DESCRIPTION OF THE DRAWINGS

A full understanding of the invention may be gained from the Drawings taken in conjunction with the Detailed Description below, wherein like reference numerals refer to like parts.

DETAILED DESCRIPTION OF THE PREFERRED EMBODIMENT

Figure 1:
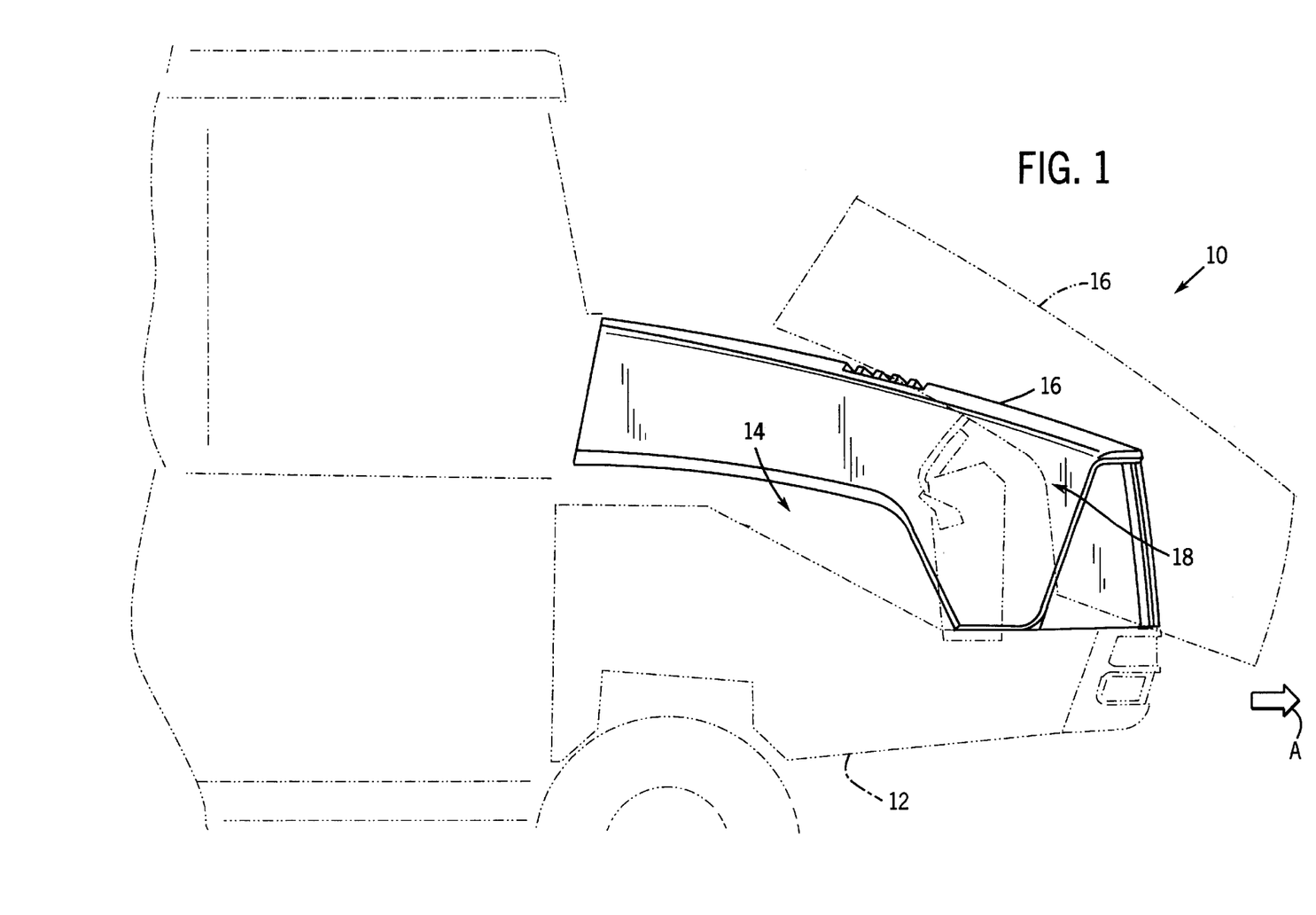
FIG. 1 is a fragmentary right-side elevation view of a work vehicle having a compartment and a hood.

FIG. 1 shows a work vehicle 10 having a frame 12, a compartment 14 associated with frame 12, and a hood 16 for at least partially covering compartment 14. Hood 16 is shown in a first, closed position in solid lines and in a second, opened position in phantom lines. A portion of a hood lift mechanism 18 is also shown in phantom lines, and may be better seen in FIGS. 2, 4, 6, and 7. As illustrated, hood 16 opens by both rotating and translating toward the front of vehicle 10, with respect to the direction of forward motion of vehicle 10 indicated by arrow "A" in FIG. 1, although those skilled in the art will recognize that hood lift mechanism 18 may instead be configured to open hood 16 toward the rear, or even toward a side.

Figures 2, 3:
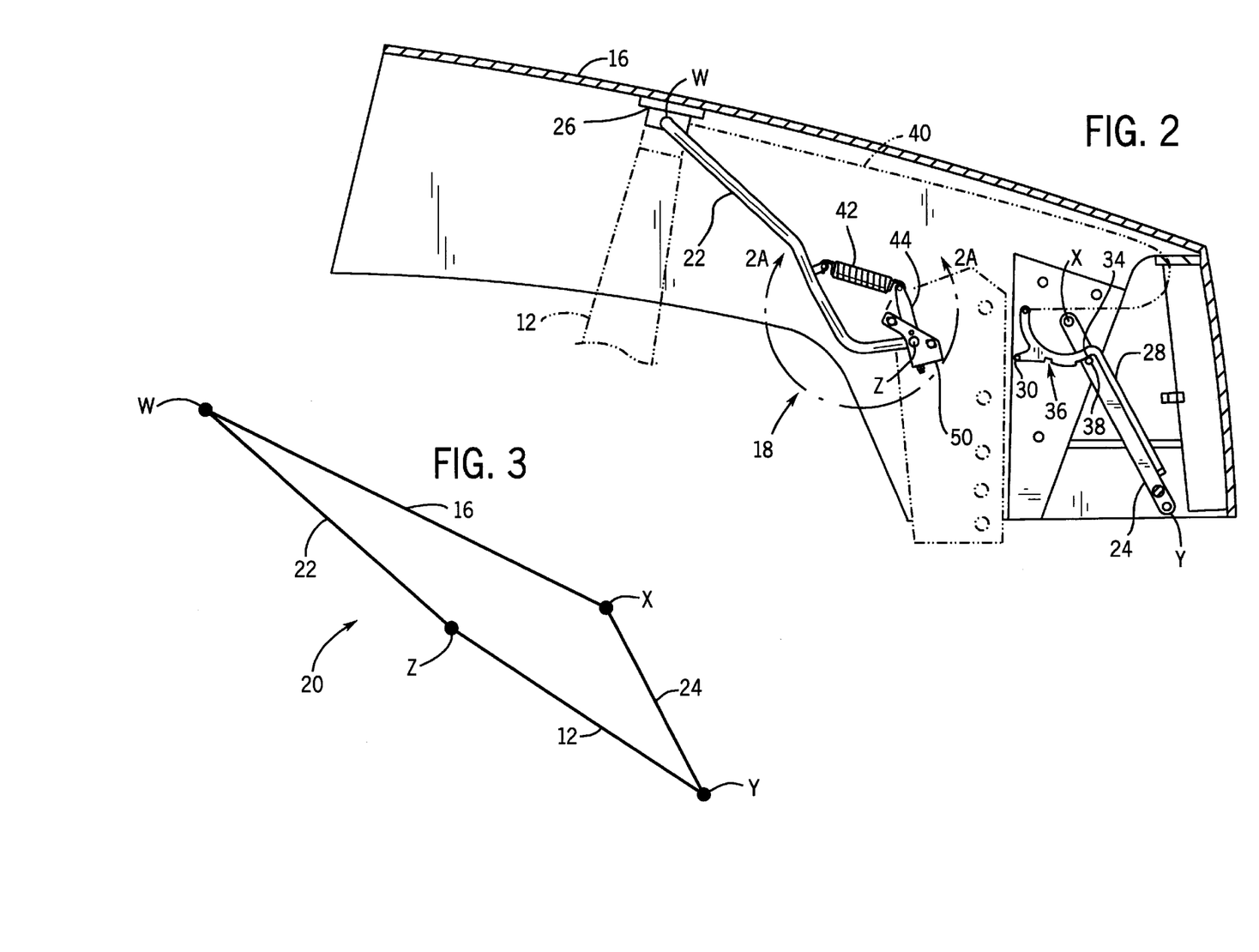
FIG. 2 is a detailed sectional right-side elevation view of the hood and a hood lift mechanism, the hood in a closed position.
FIG. 3 is a schematic representation of a four-bar linkage included within the hood lift mechanism, the hood in a closed position.

Viewing FIGS. 2 and 3 together reveals the manner in which the hood lift mechanism 18 shown in FIG. 2 includes a four-bar linkage 20 shown schematically in FIG. 3, both representing the condition of hood 16 being in a first, or closed, position. A portion of frame 12 constitutes a first bar of the four-bar linkage 20, a portion of hood 16 constitutes a second bar, while a third bar 22 and a fourth bar 24 couple hood 16 to frame 12. The bars being unequal in length with third bar 22 longer than fourth bar 24, hood 16 pivots to raise its rearmost end while being translated forward with respect to the frame, as may be seen in FIG. 1, providing a larger amount of open area for access to the interior of compartment 14 than if the bars were of equal lengths and hood 16 merely translated to a more forward second, or open, position.

Figures 5, 6:
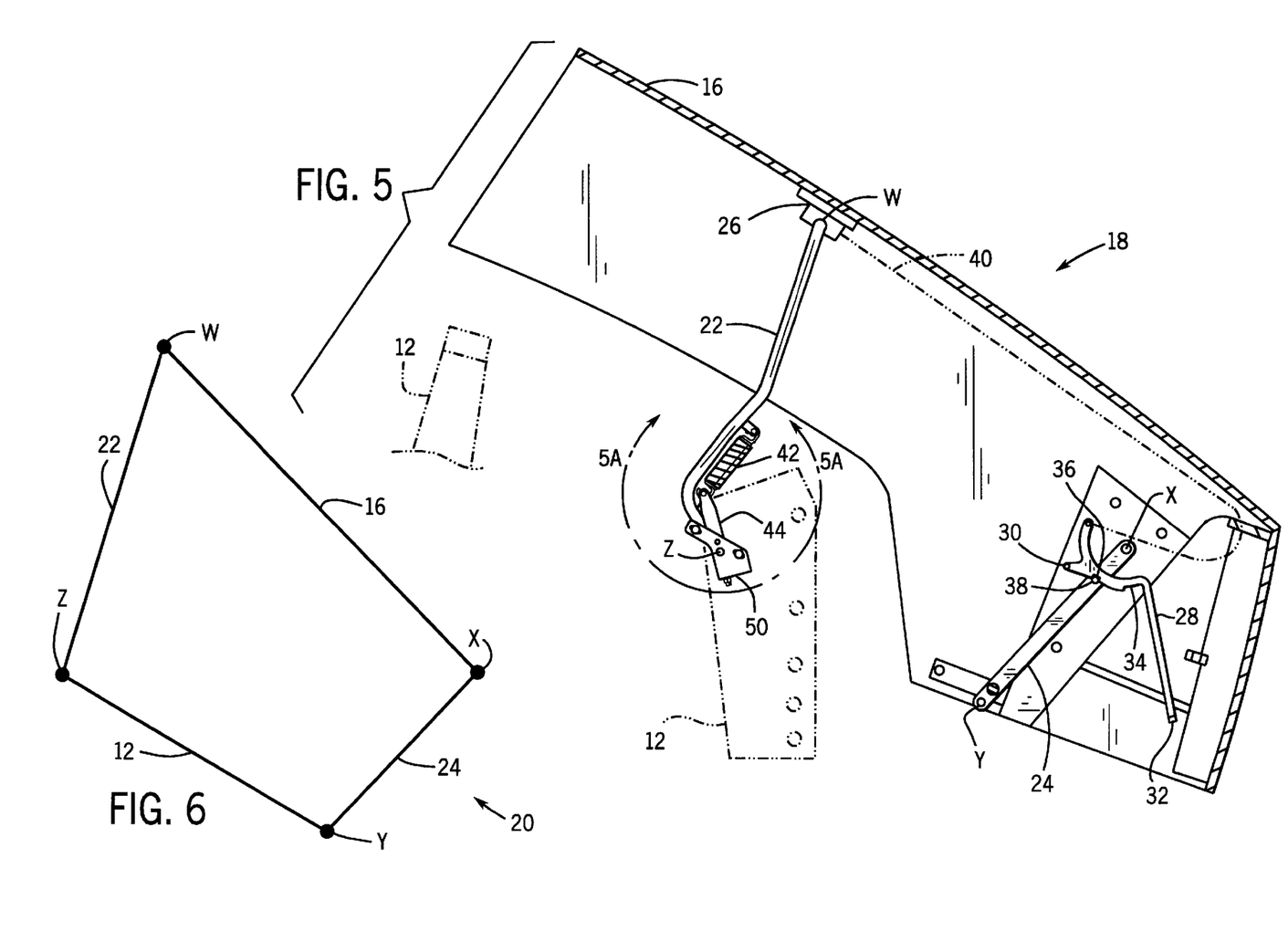
FIG. 5 is a detailed sectional right-side elevation view of the hood and a hood lift mechanism, the hood in an opened position.
FIG. 6 is a detailed sectional right-side elevation view of the hood and a hood lift mechanism, the hood in an opened position.

It is to be understood that a four-bar linkage is a kinematic device wherein movement over a defined path of motion is implicit, and that the bars are therefore coupled by pivot devices known to those experienced in the art; e.g., rivets, pins, machine screws, hinges, etc. Comparisons of the bar designations 16, 24, 12, 22 and pivot designations W, X, Y, Z in FIG. 3 with items designated by like reference characters in FIG. 2, and making a similar comparison of the same items and reference characters in FIGS. 6 and 5, show the kinematic design of hood lift mechanism 18.

FIG. 2 also shows a stationary portion of a primary latch 26 supported by a member of frame 12 and a movable portion of primary latch 26 supported by hood 16, the movable portion engaging the stationary portion when hood 16 is in the first, or closed, position. Primary latch 26 may be configured as desired; e.g., as one of the conventional hood latch designs known to those skilled in the art. A support member 28 is also shown, rotatably mounted to hood 16 at a pivot 30 and having a portion 32 configured for use as a handle. Support member 28 also includes a first catch member 34 and a second catch member 36, illustrated as notches for engaging of an engaging member 38, engaging member 38 illustrated as a pin or similar projection affixed to fourth bar 24 at an intermediate location upon fourth bar 24. Engagement of first catch member 34 of support member 28 with engaging member 38 constitutes a secondary latch 46 for backing up primary latch 26 when hood 16 is in the first position, and is disengaged for opening of hood 16 by lifting handle portion 32 of support member 28 and thereby disengaging secondary latch 46.

A coupler 40 is also shown, illustrated as a flexible cable, coupling support member 28 to the movable portion of primary latch 26, whereby a single actuation of support member 28 by movement of handle portion 32 will also and simultaneously disengage primary latch 26 for opening of hood 16. Further shown in FIG. 2 are a biasing device 42 and associated mounting device 44 for balancing the weight of the hood. Biasing device 42 may be a tensile coil spring, so that in the position shown it would exert a lifting moment upon third bar 22 of linkage 20 and thereby balance the weight of hood 16.

Figure 4:
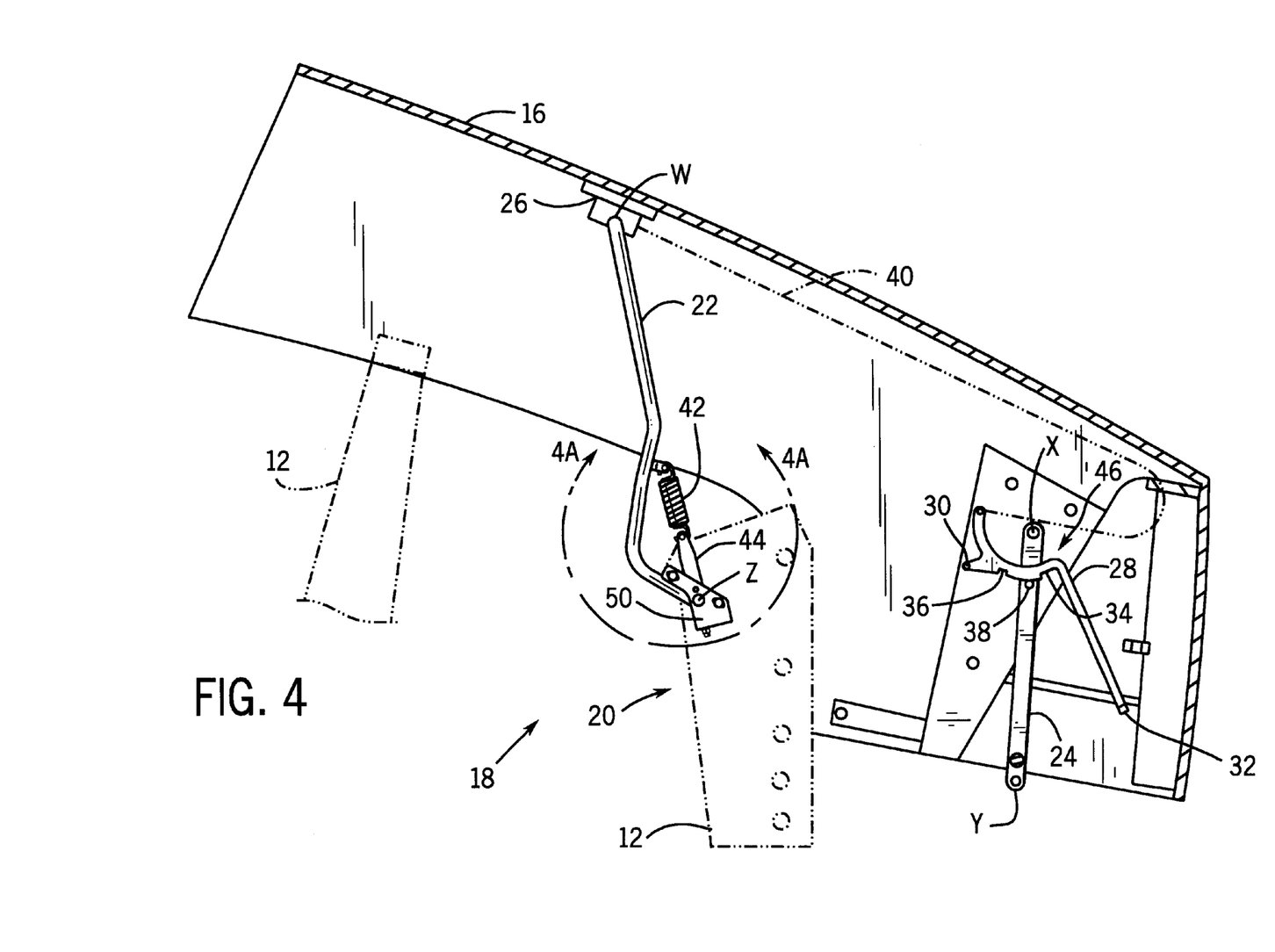
FIG. 4 is a detailed sectional right-side elevation view of the hood and a hood lift mechanism, the hood in a partially opened position.

FIG. 4 is generally similar to FIG. 2 but shows hood 16, and therefore hood lift mechanism 18, in a partially opened, intermediate position. Support member 28 has been lifted by handle portion 32, disengaging both primary latch 26 and secondary latch 46. Engaging member 38 is not engaged with either first catch member 34 or second catch member 36, and mechanism 18 and hood 16 are therefore not restrained from movement in either direction. Biasing device 42 is approximately aligned to third bar 22 of linkage 20, to which it is connected, so that no balancing moment is exerted upon hood 16, the weight of which is balanced in this position upon the lowermost pivot points of linkage 20 so that no compensating balancing moment is needed.

FIG. 5 is generally similar to both FIG. 2 and FIG. 4 but shows hood 16, and therefore hood lift mechanism 18, in a fully open position. Engaging member 38 is engaged with second catch member 36, and mechanism 18 and hood 16 are therefore restrained from movement in either direction until handle portion 32 of support member 28 is moved to disengage second catch member 36 from engaging member 38. Biasing device 42 is no longer aligned with third bar 22 of linkage 20, so that it exerts a balancing moment of magnitude and sense appropriate for assisting in the moving of hood 16 back to a closed position when support member 28 is disengaged from engaging member 38.

The term "fully opened" as used herein refers to a position of a hood (e.g., an engine compartment hood) which allows sufficient access to items within the compartment for major maintenance and repair work to be performed. Occasionally, however, an engine or other large object may need replacement, making opening of the hood beyond even the "fully open" position desirable or necessary. To this end, bar 22 may be made removable from hood 16 and/or frame 12. Hood 16 may then be pivoted about pivot point X and/or pivot point Y beyond the "fully open" position to a vertical, or other desired, position, providing sufficient access for removal and installation of, e.g., an engine.

Figure 7:
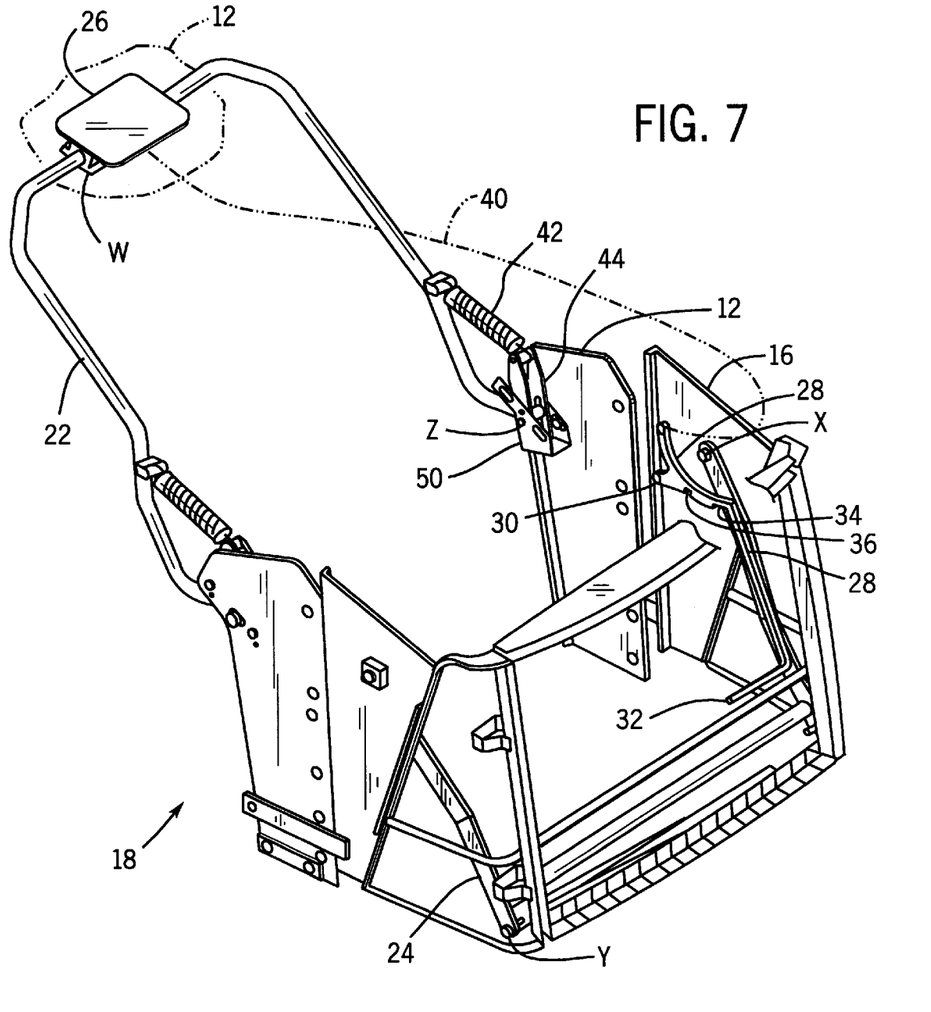
FIG. 7 is a perspective view of the hood lift mechanism, the hood in a closed position.

FIG. 7 shows hood lift mechanism 18 in cutaway; i.e., with portions of hood 16 and of frame 12 omitted for clarity in understanding the relationships of the various members and devices discussed above. Hood lift mechanism 18 is shown in a position corresponding to the first, or closed, position of hood 16, wherein (as in FIG. 2) biasing devices 42 are seen to be exerting a moment upon third bars 22 of a sense to lift third bars 22, and hence mechanism 18 and hood 16, with respect to frame 12.

Figure 8:
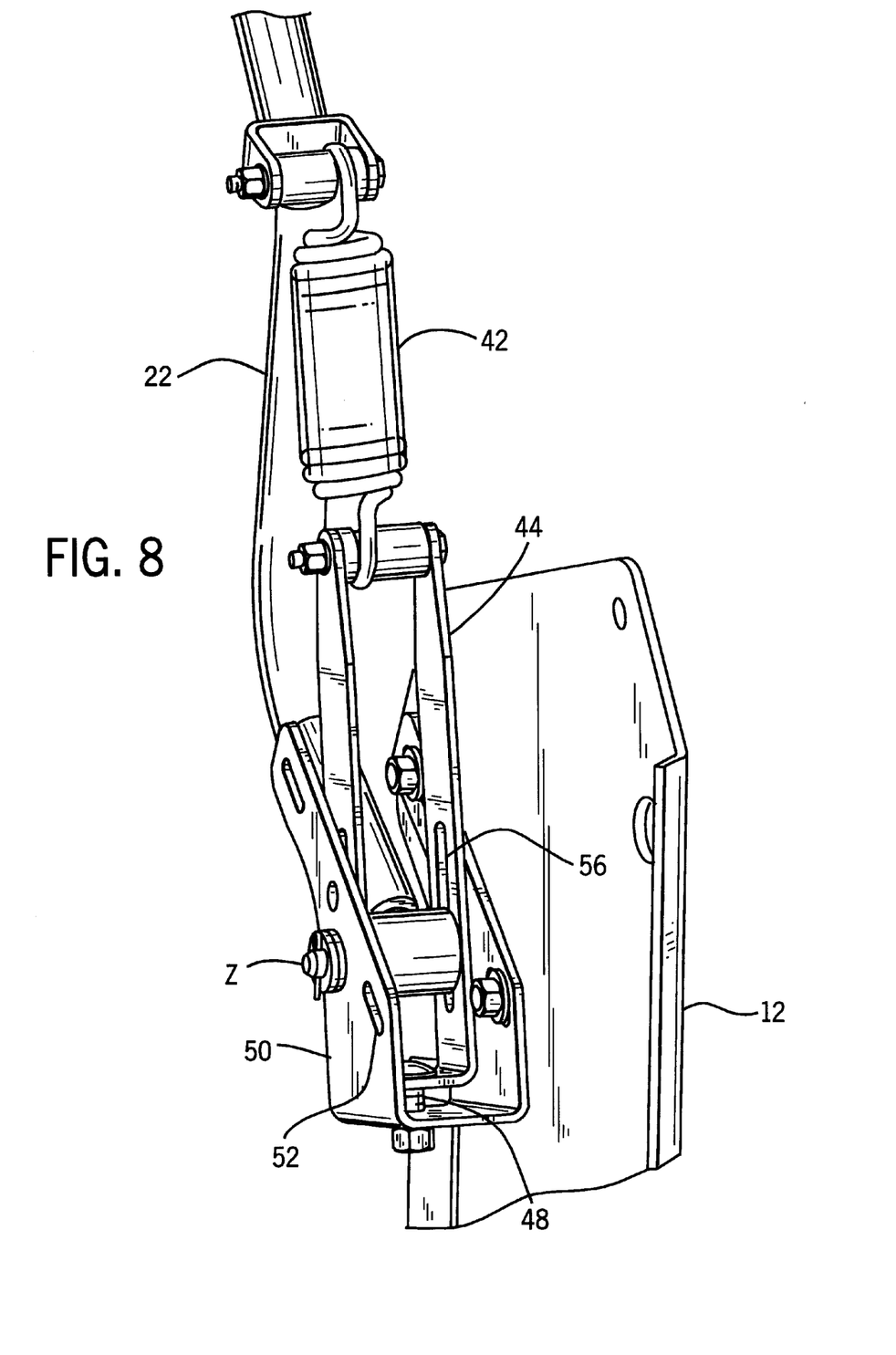
FIG. 8 is a fragmentary perspective view of a portion of the hood lift mechanism showing the biasing device and mounting device, the hood in an opened position.

Referring to FIG. 8, biasing device 42 is connected to mounting device 44 and mounting device 44 is coupled to a receiving member 50 of frame 12. Preload slots 56 enable the coupling to be one of sliding relationship, and a threaded member 48 may be used to gradually pull mounting device 44 downwardly to a seat within receiving member 50. Tension may be thereby gradually applied to biasing device 42 during assembly of hood lift mechanism 18 and of vehicle 10, facilitating ease of the assembly operation by precluding a need for handling a preloaded biasing device 42. Assembly slots 52 may be provided within either receiving member 50 or frame 12 to enable alignment of hood 16 to frame 12 during assembly. Assembly slots 52, or a series of two or more mounting holes, may also be used to select a spring preload upon assembly for counterbalancing hoods of various weights and/or locations of center of gravity.

Figure 2A:
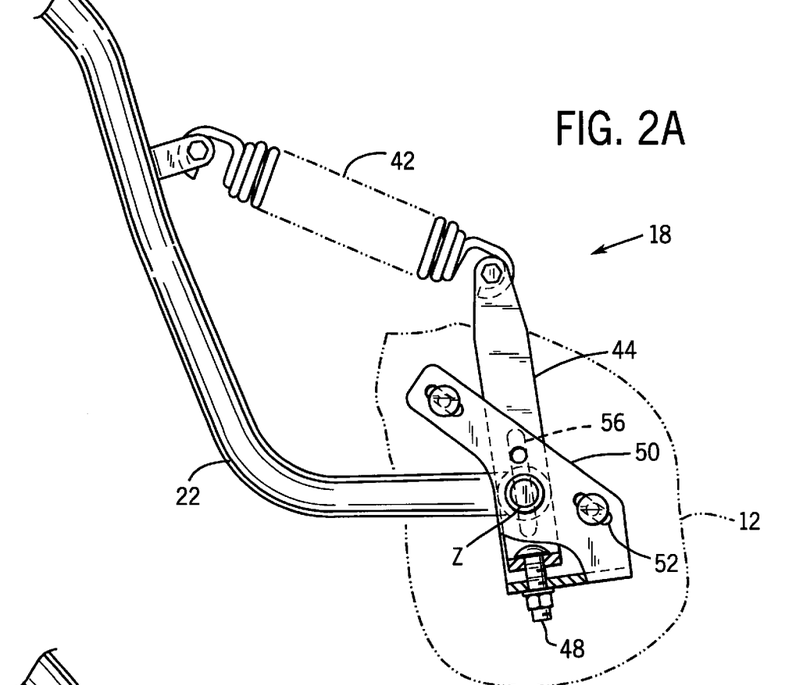
FIG. 2A is a fragmentary elevation of a portion of the mechanism showing a biasing device and a mounting device enclosed within a circle designated 2A—2A in FIG. 2, the hood in a closed position.
Figure 9:
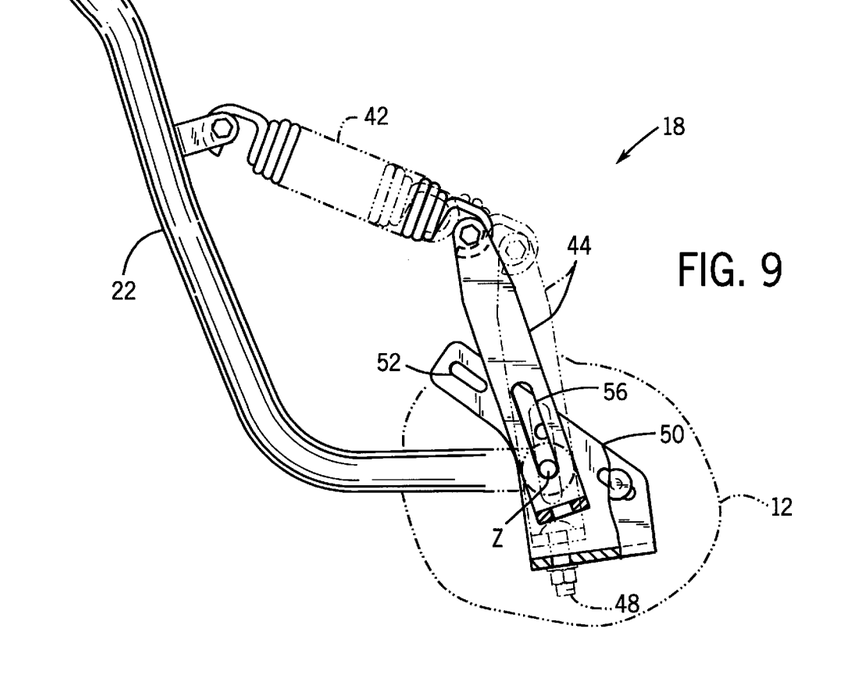
FIG. 9 is a fragmentary detail of a portion of hood lift mechanism showing the mounting device partially installed, and thereby the manner of preloading the biasing device.

FIGS. 2A and 9, viewed in conjunction, illustrate the relationships of parts discussed above in association with FIG. 8 for the condition of hood lift mechanism 18 being in a position corresponding to the first, or closed, position of hood 16. Engagement of a shaft 54 (which may be a pin or a machine screw) projecting through preload slots 56 in mounting device 44 and associated apertures in receiving member 50 dispose mounting device 44 properly with respect to receiving member 50 while threaded member 48 pulls mounting device 44 down onto the seat within receiving member 50 and simultaneously preloads biasing device 42.

Figures 4A, 5A:
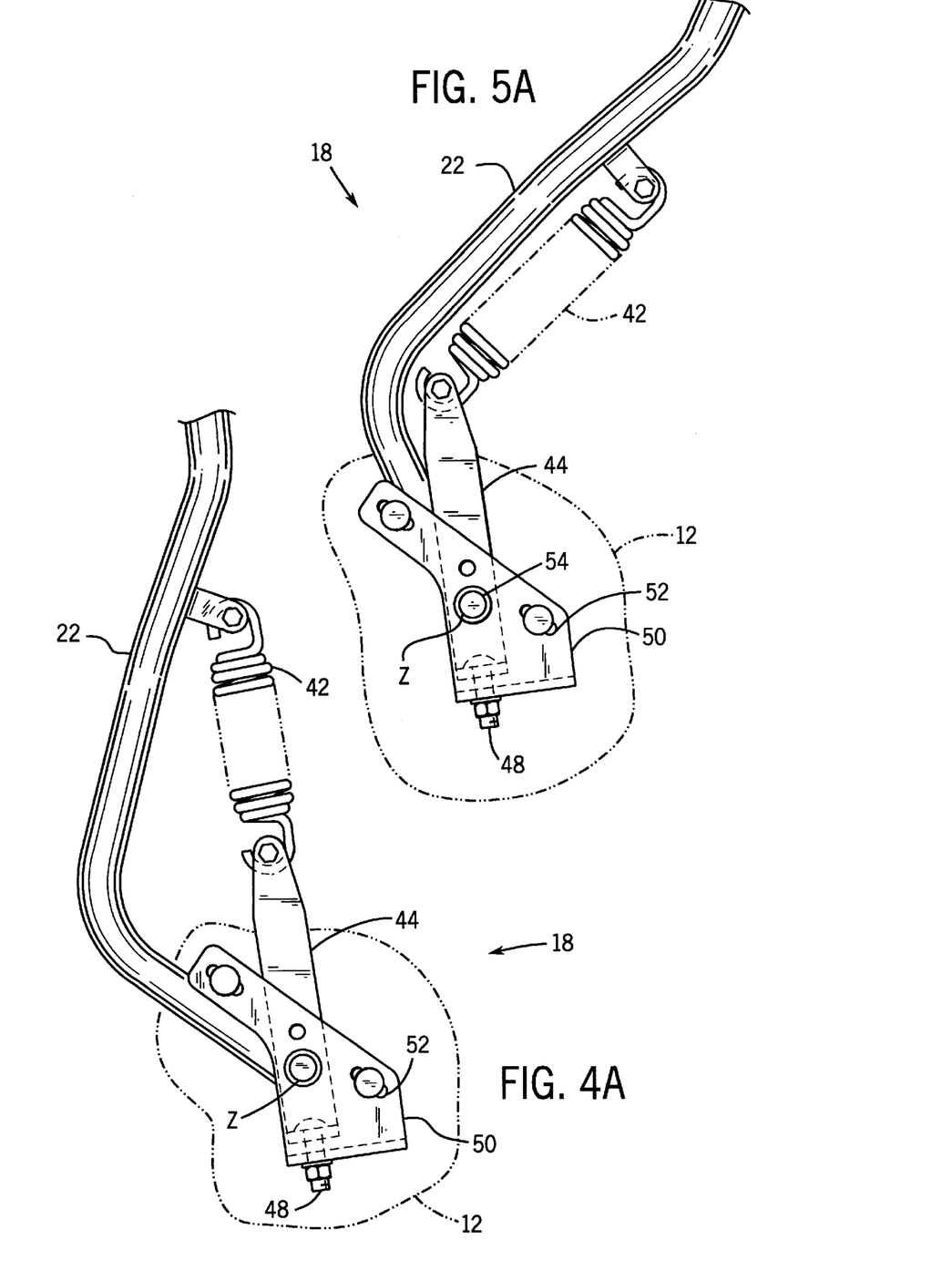
FIG. 4A is a fragmentary elevation of a portion of the mechanism showing a biasing device and a mounting device enclosed within a circle designated 4A—4A in FIG. 4, the hood in a partially opened position.
FIG. 5A is a fragmentary elevation of a portion of the mechanism showing a biasing device and a mounting device enclosed within a circle designated 5A—5A in FIG. 5, the hood in an opened position.

FIG. 4A shows more clearly the dispositions of biasing device 42 and third bar 22 when hood 16, and therefore hood lift mechanism 18 and four-bar linkage 20, are in an intermediate, partially opened position. In that position, hood 16 (having a predetermined weight and location of center of gravity) is balanced about the effective pivot point of hood 16 within linkage 20, and no balancing moment is required of biasing device 42. Balancing device 42 is therefore approximately aligned with the pivot points of third bar 22, whereby its line of action is not displaced with respect to an effective centerline of third bar 22 and hence biasing device 42, irregardless of the force it may exert, produces no balancing moment.

FIG. 5A shows more clearly the dispositions of biasing device 42 and third bar 22 when hood 16, and therefore hood lift mechanism 18 and four-bar linkage 20, are in the second, or fully opened, position. In that position, hood 16 (having a predetermined weight and location of center of gravity) is not balanced about the effective pivot point of hood 16 within linkage 20, and a counterclockwise (when viewed from the right) balancing moment is required of biasing device 42 because the center of gravity of hood 16 is forward of the effective pivot point of hood 16 within linkage 20. Biasing device 42 is therefore disposed above the lower pivot point of third bar 22, whereby its line of action causes it to exert a clockwise balancing moment upon linkage 20, and thereby upon hood lift mechanism 18 and hood 16.

While the embodiments illustrated in the FIG's. and described above are presently preferred, it should be understood that these embodiments are offered by way of example only. For example, the support member can be pivotally or slidably mounted upon the frame instead of the hood. Catch members can be apertures or spring-loaded detents instead of notches. The coupler can be a rod or chain instead of a flexible cable. The fully open position of the hood need not be at the angle shown, but can extend considerably beyond that. Similarly, other differences of construction rather than invention will be obvious to those skilled in the art. The invention is not intended to be limited to any particular embodiment, but is intended to extend to various modifications that nevertheless fall within the scope and spirit of the appended claims.

What is claimed is:

1. A work vehicle comprising:
   a frame;
   a compartment;
   a hood coupled to the frame, and configured to at least partially cover the compartment when disposed in a first position wherein the hood is closed; and
   a mechanism coupling to the hood to the frame, the mechanism configured to move the hood between the first position and at least a second position, wherein the hood is at least partially opened when in a position other than the first position;
   the mechanism including at least one four-bar linkage configured to pivot and translate the hood, a first bar of the linkage including a portion of the frame, a second bar of the linkage including a portion of the hood, a third bar of the linkage pivotably coupled to each of the first bar and the second bar, and a fourth bar of the linkage pivotably coupled to each of the first bar and the second bar, the vehicle further having a support member configured to engage the at least one linkage at predetermined positions corresponding to the first and at least second positions of the hood and thereby immobilize the at least one linkage, and thereby the hood, against a further change in position in at least one direction, wherein the support member has a first portion movably secured to the vehicle, a second portion configured as a handle, and an intermediate portion disposed between the first and second portions and including at least one catch member disposed to engage an engaging member of at the at least one linkage and thereby immobilize the at least one linkage when the hood is in a predetermined position, the at least one catch member engageable and disengageable by movement of the support member with respect to the vehicle.

2. The work vehicle of claim 1, further comprising a primary latch for securing the hood to the frame in the first position.

3. The work vehicle of claim 2, further comprising a secondary latch for backing up the primary latch, the secondary latch including a first catch member positioned on the support member for engagement of an engaging member of the at least one linkage to secure the hood in its first position regardless of the proper functioning of the primary latch.

4. The work vehicle of claim 3, further comprising a coupler coupling the support member to the primary latch wherein the support member functions as a single lever actuating device of both the primary latch and the secondary latch when the hood is in its first position.

5. The work vehicle of claim 4, further comprising at least one biasing device disposed within the mechanism and configured to oppose the weight of the hood, the hood being thereby movable between positions regardless of the weight and the weight distribution of the hood.

6. The work vehicle of claim 5, wherein the at least one biasing device is configured to generate a first balancing moment of a first value and sense when the hood is in its first position, a second balancing moment of a second value and sense when the hood is in its second position, and a balancing moment of an intermediate value and a sense corresponding to the amount of opening of the hood when the hood is partially opened, the hood being thereby substantially balanced when it its first, second, and intermediate positions.

7. The work vehicle of claim 6, wherein the biasing device has a predetermined spring rate and is selected from a plurality of biasing devices having differing spring rates, to provide a particular value of balancing moment associated with the weight and the weight distribution of a particular hood.

8. The work vehicle of claim 6, wherein the preload of the biasing device is adjustable to provide a particular predetermined value of balancing moment associated with the weight and the weight distribution of a particular hood.

9. The work vehicle of claim 8, further comprising a mounting device coupled to an end of the biasing device and configured to be mounted to a particular position of the frame corresponding to the weight and the weight distribution of a particular hood, and including a threaded member for preloading of the biasing device to the predetermined value.

10. The work vehicle of claim 5, wherein a bar of the four-bar linkage is disengageable from at least one of the hood and the frame and the hood is thereby pivotable about a linkage joint remaining in engagement beyond the fully opened position to a position wherein the hood is clear of interference with removal of objects from the compartment.

11. The work vehicle of claim 1, wherein the support member is configured to immobilize the at least one linkage, and thereby the hood, against a further change of position in first and second opposite directions.

12. The work vehicle of claim 1 including an operator station supported by the frame and spaced from a front end of the work vehicle, wherein the hood is coupled to the frame between the operator station and the front of the work vehicle and wherein the mechanism is configured to pivot the hood away from the operator station.

13. A hood opening mechanism for a work vehicle, the vehicle having a compartment and a hood covering the compartment, the hood movably coupled to a frame of the vehicle by the mechanism, the mechanism comprising:

at least one four-bar linkage including a first bar, a second bar, a third bar pivotably coupled to each of the first bar and the second bar, and a fourth bar pivotably coupled to each of the first bar and the second bar, the at least one four-bar linkage configured to pivot and translate the hood, and move the hood from a first position, wherein the hood is closed, to at least a second position, wherein the hood is at least partially opened; and a support member configured to engage a member of the at least one linkage at predetermined positions corresponding to the first and at least second positions of the hood and to thereby immobilize the at least one linkage, and thereby the hood, against a further change in position in at least one direction, wherein the support member has a first portion movably secured to the vehicle, a second portion configured as a handle, and an intermediate portion disposed between the first and second portions and including at least one catch member disposed to engage an engaging member of the at least one linkage and thereby immobilize the at least one linkage when the hood is in a predetermined position, the at least one catch member engageable and disengageable by movement of the support member with respect to the vehicle.

14. The mechanism of claim 13, further comprising a primary latch for securing the hood to the frame in the first position.

15. The mechanism claim 14, further comprising a secondary latch for backing up the primary latch, the secondary latch including a first catch member positioned on the support member for engagement of an engaging member of the at least one linkage to secure the hood in its first position regardless of the proper functioning of the primary latch.

16. The mechanism of claim 15, further comprising a coupler coupling the support member to the primary latch wherein the support member functions as a single lever actuating device of both the primary latch and the secondary latch when the hood is in its first position.

17. The mechanism of claim 16, further comprising at least one biasing device disposed within the mechanism and configured to oppose the weight of the hood, the hood being thereby movable between positions regardless of the weight and the weight distribution of the hood.

18. The mechanism of claim 17, wherein the at least one biasing device is configured to generate a first balancing moment of a first value and sense when the hood is in its first position, a second balancing moment of a second value and sense when the hood is in its second position, and a balancing moment of an intermediate value and a sense corresponding to the amount of opening of the hood when the hood is partially opened, the hood being thereby substantially balanced when it its first, second, and intermediate positions.

19. The mechanism of claim 18, wherein the biasing device has a predetermined spring rate and is selected from a plurality of biasing devices having differing spring rates, to provide a particular value of balancing moment associated with the weight and the weight distribution of a particular hood.

20. The mechanism of claim 18, wherein the preload of the biasing device is adjustable to provide a particular predetermined value of balancing moment associated with the weight and the weight distribution of a particular hood.

21. The mechanism of claim 20, further comprising a mounting device coupled to an end of the biasing device and configured to be mounted to a particular position of the frame corresponding to the weight and the weight distribution of a particular hood, and including a threaded member for preloading of the biasing device to the predetermined value.

22. The mechanism of claim 13, wherein a bar of the four-bar linkage is disengageable from at least one of the hood and the frame and the hood is thereby pivotable about a linkage joint remaining in engagement beyond the fully opened position to a position wherein the hood is clear of interference with removal of objects from the compartment.

23. The hood opening mechanism of claim 13, wherein the support member is configured to immobilize the at least one linkage, and thereby the hood, against a further change of position in first and second opposite directions.

24. A method of providing access to a compartment of a work vehicle having a hood for substantially covering the compartment in a closed position of the hood, the method comprising the steps of:

(a) movably coupling the hood to a frame of the vehicle by at least one four-bar linkage configured to pivot and translate the hood, a first bar of the at least one linkage including a portion of the frame, a second bar of the at least one linkage including a portion of the hood, a third bar of the linkage pivotably coupled to each of the first bar and the second bar, and a fourth bar of the linkage pivotably coupled to each of the first bar and the second bar;

(b) securing the hood to the fame in the closed position by a primary latch;

(c) moving the hood between a closed position and at least one open position;

(d) retaining the hood in the at least one opened position by engaging a catch portion of a support member with an engaging member of the at least one linkage, thereby retaining the at least one linkage and thereby the hood against further movement in at least one direction; and (e) backing up the primary latch by engaging a catch portion of the support member with an engaging member of the at least one linkage in the closed position of the hood, the engagement secondarily latching the hood to the frame and thereby retaining the hood in its closed position regardless of the proper functioning of the primary latch.

25. The method of claim 24, wherein a portion of the support member is configured for use as a handle, and further comprising the step of:

(f) coupling the support member of the primary latch, the support member thereby functioning as a single lever actuating device of both the primary latch and the secondary latch when the hood is in the closed position.

26. The method of claim 25, wherein the at least one opened position of the hood is a fully opened position, and further comprising the step of:

(g) raising the hood to an intermediate position.

27. The method of claim 26, further comprising the step of:

(h) biasing members of the mechanism by a biasing device to oppose the weight of the hood, the hood being thereby movable between positions regardless of the weight and the weight distribution of the hood.

28. The method of claim 27, further comprising the step of:

(i) selecting at least one of the position, spring rate, and preload of the at least one biasing device to:

generate a first balancing moment of a first particular value and sense, the value and the sense corresponding to the weight and the weight distribution of a particular hood when the hood is in its closed position;

generate a second balancing moment of a second particular value and sense, the value and the sense corresponding to the weight and the weight distribution of a particular hood when the hood is disposed in the fully opened position; and generate a balancing moment of a sense and an intermediate value corresponding to the weight and the weight distribution of a particular hood when the hood is disposed in the partially opened position;

the hood being thereby substantially balanced when disposed in the closed, partially opened, and fully opened positions.

29. The method of claim 28, further comprising the step of:

(j) coupling a mounting device to an end of the biasing device, the mounting device configured to be mounted to a particular position of the frame corresponding to the weight and the weight distribution of a particular hood, and including a threaded member for preloading the biasing device to the predetermined value.

30. The method of claim 29, further comprising the step of:

(k) disengaging an end of a bar of the four-bar linkage from the region of the primary latch when the hood is disposed in the fully opened position, and pivoting the hood about a linkage joint remaining in engagement beyond the fully opened position to a position wherein the hood is clear of interference with removal of objects from the compartment.

31. The method of claim 24, wherein the support member is configured to retain the at least one linkage, and thereby the hood, against a further change of position in first and second opposite directions.

32. A work vehicle comprising:

a frame;

a compartment;

a hood coupled to the frame, and configured to at least partially cover the compartment when disposed in a first position wherein the hood is closed; and a mechanism coupling to the hood to the frame, the mechanism configured to move the hood between the first position and at least a second position, wherein the hood is at least partially opened when in a position other than the first position;

the mechanism including at least one four-bar linkage configured to pivot and translate the hood, a first bar of the linkage including a portion of the frame, a second bar of the linkage including a portion of the hood, a third bar of the linkage pivotably coupled to each of the first bar and the second bar, and a fourth bar of the linkage pivotably coupled to each of the first bar and the second bar, the vehicle further having a support member configured to engage the at least one linkage at predetermined positions corresponding to the first and at least second positions of the hood and thereby immobilize the at least one linkage, and thereby the hood, against a further change in position in at least one direction, wherein the support member is configured to immobilize the at least one linkage, and thereby the hood, against a further change of position in first and second opposite directions.

33. The work vehicle of claim 32 including an operator station supported by the frame and spaced from a front end of the work vehicle, wherein the hood is coupled to the frame between the operator station and the front of the work vehicle and wherein the mechanism is configured to pivot the hood away from the operator station.

34. A hood opening mechanism for a work vehicle, the vehicle having a compartment and a hood covering the compartment, the hood movably coupled to a frame of the vehicle by the mechanism, the mechanism comprising:

at least one four-bar linkage including a first bar, a second bar, a third bar pivotably coupled to each of the first bar and the second bar, and a fourth bar pivotably coupled to each of the first bar and the second bar, the at least one four-bar linkage configured to pivot and translate the hood, and move the hood from a first position, wherein the hood is closed, to at least a second position, wherein the hood is at least partially opened; and a support member configured to engage a member of the at least one linkage at predetermined positions corresponding to the first and at least second positions of the hood and to thereby immobilize the at least one linkage, and thereby the hood, against a further change in position in at least one direction, wherein the support member is configured to immobilize the at least one linkage, and thereby the hood, against a further change of position in first and second opposite directions.

* * * * *